Figure 4:
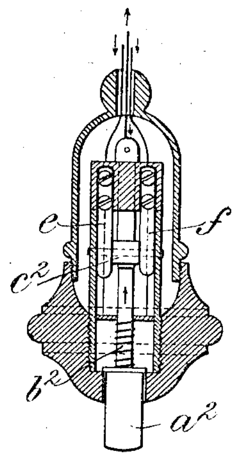

C. CARANGELO.
INCANDESCENT MULTIPLE CIRCUIT ELECTRIC LAMP.
APPLICATION FILED SEPT. 14, 1910.
1,029,851. Patented June 18, 1912.
3 SHEETS—SHEET 1.
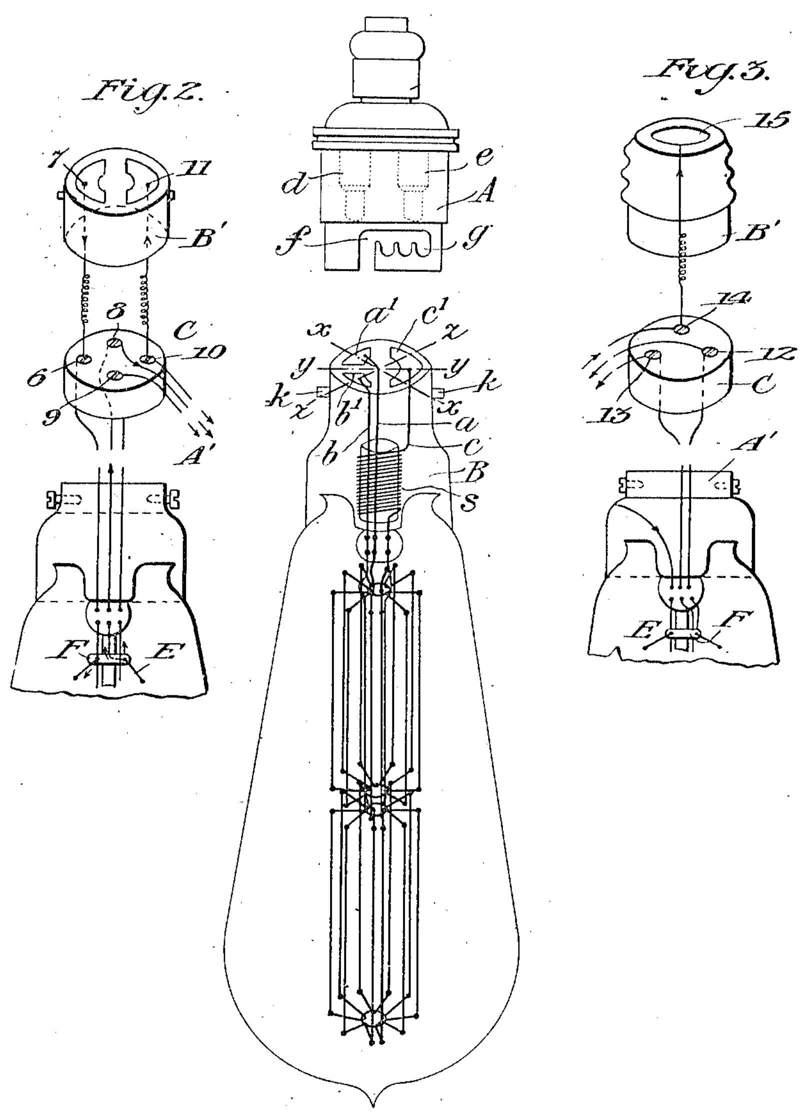
WITNESSES:
René Bruine
William F. Martinez
INVENTOR:
Constantin Carangelo,
By Attorneys,
Fraser Turk & Myers

C. CARANGELO.

INCANDESCENT MULTIPLE CIRCUIT ELECTRIC LAMP.

APPLICATION FILED SEPT. 14, 1910.

1,029,851.

Patented June 18, 1912.

3 SHEETS—SHEET 2.

WITNESSES:

René Bruine

William F. Martinez

INVENTOR:

Constantin Carangelo,

By Attorneys,

Fraser Turk & Myers

C. CARANGELO.
INCANDESCENT MULTIPLE CIRCUIT ELECTRIC LAMP.
APPLICATION FILED SEPT. 14, 1910.
1,029,851. Patented June 18, 1912.
3 SHEETS—SHEET 3.
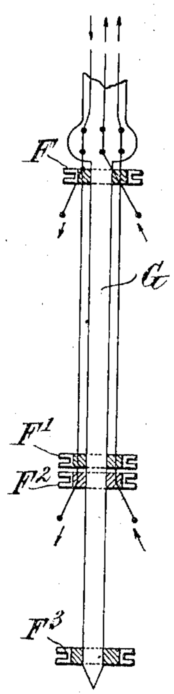
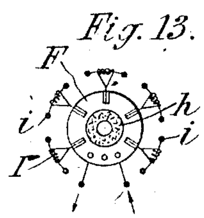
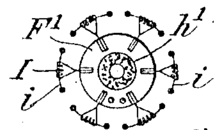
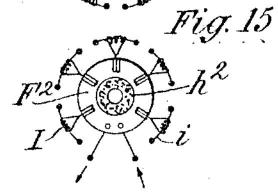
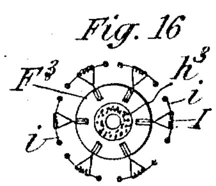
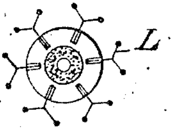
WITNESSES:
René Bruine
William F. Martinez
INVENTOR:
Constantin Carangelo,
By Attorneys,
Fraser Turk & Myers

UNITED STATES PATENT OFFICE.

CONSTANTIN CARANGELO, OF DELTA BARRAGE, NEAR CAIRO, EGYPT.

INCANDESCENT MULTIPLE-CIRCUIT ELECTRIC LAMP.

1,029,851. Specification of Letters Patent. Patented June 18, 1912.

Application filed September 14, 1910. Serial No. 581,994.

*To all whom it may concern:*

Be it known that I, CONSTANTIN CARANGELO, a subject of the King of Greece, residing at Delta Barrage, near Cairo, Egypt, have invented certain new and useful Improvements in Incandescent Multiple-Circuit Electric Lamps, of which the following is a specification.

The present invention relates to incandescent multiple circuit electric lamps and has for its object to provide means whereby the various circuits may be completed either separately or simultaneously, whereas the said lamps may be adjusted to any desired positions and are made for any of the usual tensions. This lamp system has not only the advantage to allow of the lighting intensity to be modified as desired, but also to provide a more durable lamp, since the total life of the lamp may be equal to the added lives of both circuits, the total life being shortened when the circuits are operating simultaneously in parallel. In this lamp, the two circuits completed by the filaments, for example by the metal filaments, are either arranged above each other or side by side and mounted in parallel. Both circuits may be either of the same intensities or of different intensities, so that I may obtain, in the first instance:

5, 10 or 15 candles
15, 30 " 45 "
45, 90 " 135 "

and in the second instance:

5, 5 or 10 candles
10, 10 " 20 "
20, 20 " 40 "

These lamps may be made on the one hand with a special plug adapted to be engaged either in a bayonet-socket or in a screw-socket. In this case the plug may be adjusted with regard to the socket in various separate positions corresponding to the various mountings which may be used. Assuming for example that the lamp has two circuits three positions will result viz: 1°, first circuit only closed; 2°, second circuit only closed; 3°, both circuits closed together in parallel. These lamps may also be provided with outer independent switches, whereby the use will be more convenient. The plug of the lamps will then be arranged in two parts with interposition of an insulating disk and will be shaped for bayonet or screw socket like the plug of an ordinary lamp, so that multiple circuit lamps embodied in this invention can be adapted to existing sockets.

This invention will be more clearly understood with reference to the annexed drawings in which lamps are shown as comprising two circuits, but it will be obvious that lamps can be made with a larger number of circuits or lights without departing from the principle of the invention.

Figure 5:
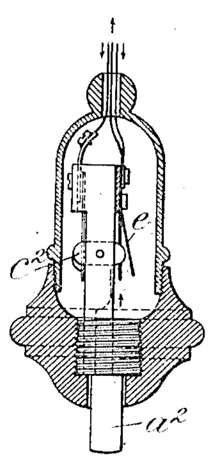
Figure 6:
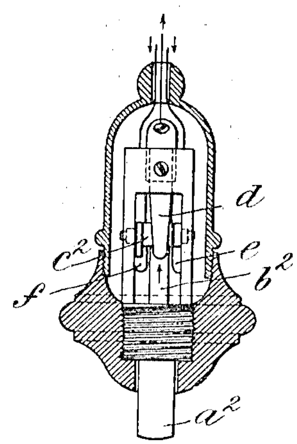

In the accompanying drawings, Figure 1 illustrates a lamp for bayonet connection embodying this invention. Fig. 2 illustrates a form of the lamp when combined with an independent switch. Fig. 3 shows this lamp for screw connection instead of bayonet connection. Figs. 4, 5 and 6 show the automatic switch in front view, side view and back view respectively. Figs. 7, 8, 9, 10 and 11 show the various positions corresponding to the different combinations for lighting. Fig. 12 is a cross section showing the glass support for the disk. Figs. 13, 14, 15, 16 are plan views of the four disks with filament supports. Fig. 17 is a modification of Fig. 16.

In Fig. 1 is shown a lamp for bayonet connection without independent switch. The negative wires $a$ $b$ of both lamp circuits terminate at the contacts $a^1$ $b^1$ respectively and the positive wire $c$ is connected to the larger contact $c^1$, these three contacts being so arranged as to form a triangle on the upper surface of the plug. The socket A conforming to existing sockets of standard design is provided with two spring contacts $d$ $e$ and is only modified in that each of the horizontal grooves $f$ of the bayonet connection comprises three notches in which are engaged the pins $k$ of the plug. This enables the plug of the lamp to be brought into the positions shown in dotted lines $x$—$x$, $y$—$y$, $z$—$z$, with regard to its socket, the first of which corresponds to the closing of the circuit of the upper light, the spring contact $d$ bearing on the contact $a^1$, and the spring contact $e$ on the contact $c^1$, the second corresponds to the parallel closing of the circuit of both lights, the spring contact $d$ bearing on the contacts $a^1$ $b^1$ simultaneously and the spring contact $e$ always remaining on the contact $c^1$, and the third corresponds to the closing of the circuit of the lower light, the spring contact $d$ bearing on the contact $b^1$, whereas the spring contact $e$ always remains in contact with $c^1$.

In the case of a screw connection, the plug will be provided with one spring contact only instead of two and the common return wire or the current supply wire will be connected to the plug forming a mass.

In the Figs. 2 and 3 are shown two types of lamp with multiple-circuit one made for bayonet connection, the other for screw connection, in the case where an independent switch is used. This switch comprises a push $a^2$ which when pressed successively, enables the current to flow either through the first or through the second or third circuits or through both circuits simultaneously and then to cut the same. To this end, the pressure exerted on the push $a^2$ is transmitted to a rod $b^2$ which causes the rotation of a kind of eccentric cam $c^2$. This eccentric cam $c^2$ is constituted through a parallelepipedic mass 1 carrying a double symmetric cam 2 $2^1$ at one end and an eccentered cam 3 at the other end. This member rotates about an axis 5 held in a support within the switch and between a contact piece $d$ connected to the return wire on the one hand and between two spring blades $e$ $f$ connected to the two current supply wires on the other hand, the insulation being effected by suitable means.

Figures 7, 8, 9, 10, 11:
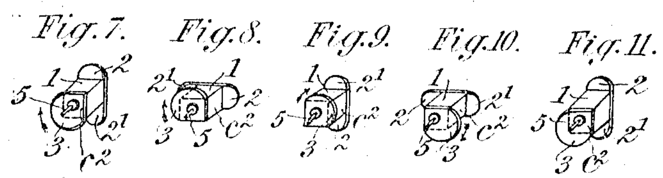

In the position shown in Fig. 7 the double cam 2, $2^1$ for example being placed vertically no part of the member $c^2$ touches the two blades $e$ $f$, which are at rest. There is no contact between the supply wire and the return wire: the circuit is interrupted and the lamp is out. In the position shown in Fig. 8 one of the sections of the cam, 2 for example, is encountering a spring blade $e$ or $f$, thus completing the circuit between the return wire and one of the supply wires; one of the lights is then on. In the position shown in Fig. 9 the other light is on. In the position shown in Fig. 10 both lights are on at the same time and in the position shown in Fig. 11 which is the same as shown in Fig. 7 the lamp is again out.

The plug of the lamp is divided in two parts $A^1$ $B^1$ and to the part $A^1$ is added a porcelain disk C, having current supply screws on its upper part. The direction of the current is indicated by the arrows. Owing to the interposition of this disk the plug of the lamp is entirely the same as that of ordinary lamps, and it will be seen that it may be adapted to any, bayonet or screw socket, contrary to the already known types of multiple circuit lamps.

In the case of a bayonet lamp, it will be necessary to provide four screws on the porcelain part C. One of these four screws, such as 6, receives the current from the contact 7 to convey it to both circuits; two other screws 8, 9 convey the current from the two circuits to the switch; and finally the fourth screws 10 completes the switch circuit through the second contact 11 of the plug $B^1$. In the case of a screw lamp the plug itself is used as a contact and leads the current to both circuits; the current of the two circuits flows out through the screws 12 and 13, goes to the switch and the circuit is completed through the third screws and the contact 15; there is thus three screws only in such case. The filaments are then connected in the following manner: On the glass support G are arranged four disks such as F $F^1$ $F^2$ $F^3$ which are made of porcelain, glass or any other insulating material with central bores in which are interposed hollow cork or asbestos washers $h$ $h^1$ $h^2$ $h^3$. These washers have a central bore through which passes the glass support or stem G, and owing to the elasticity of the cork or asbestos the disks are held on the support by their own pressure. On the periphery of the said disks are arranged the supports, such as I. These supports are constituted by a spiral wound copper wire inserted in the porcelain disk and carrying a small argentan post $i$. They can also be replaced by supports such as at L, Fig. 17. With this device, the supports and the filaments of the lamp are fastened, without solder, by heating in a flame jet and thereby render the construction of the lamp much more simple. It will be obvious that this special arrangement of the insulating disks can be adapted to the ordinary lamps in the trade.

The switch can be used for lighting the various lights of any number of multiple circuit lamps arranged in a group separately and simultaneously, or for putting them out. It can also be adapted to any number of single circuit lamps arranged in a group, and in the latter case it has a great economical advantage on the ordinary switches for single circuit lamps arranged in a group, owing to the fact that the usual switches now in use involve considerable expense in the arrangement of electric wires or cords, whereas the present switches only require half a meter of cord for the same purpose.

I claim:

1. In an incandescent lamp having metal filaments, a glass supporting rod and insulating disks which are formed with a central opening in which is inserted a cork ring or washer through which passes the glass rod of the lamp, the elasticity of the cork being sufficient to hold the disks on the stem.

2. An incandescent electric lamp, comprising filaments, insulating disks for supporting said filaments, a support for said disks and a resilient packing between said support and disks.

3. An incandescent electric lamp, comprising filaments, insulating disks having projections for supporting said filaments, a support for said disks and a resilient packing between said support and disks.

4. An incandescent electric lamp, comprising filaments, insulating disks having projections for supporting said filaments, argentan bonds between said projections and filaments, a support for said disks and a resilient packing between said projections and filaments.

In witness whereof I have hereunto set my hand in presence of two witnesses.

CONSTANTIN CARANGELO.

Witnesses:
ARMENGAUD, Jeune,
H. C. COXE.